(12) United States Patent
Binder

(10) Patent No.: US 10,264,317 B2
(45) Date of Patent: Apr. 16, 2019

(54) CONTENT ACCESS DEVICE GEOLOCATION VERIFICATION

(71) Applicant: Layer3 TV, Inc., Denver, CO (US)

(72) Inventor: Jeffrey Binder, Denver, CO (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 15/279,086

(22) Filed: Sep. 28, 2016

(65) Prior Publication Data

US 2018/0091855 A1     Mar. 29, 2018

(51) Int. Cl.
*H04H 60/33*     (2008.01)
*H04N 21/45*     (2011.01)
*H04N 21/258*    (2011.01)
*H04N 21/658*    (2011.01)

(52) U.S. Cl.
CPC ... *H04N 21/4524* (2013.01); *H04N 21/25816* (2013.01); *H04N 21/25841* (2013.01); *H04N 21/6582* (2013.01)

(58) Field of Classification Search
CPC ......... H04N 21/25841; H04N 21/2585; H04N 21/254; H04N 21/4126; H04N 21/44213
See application file for complete search history.

(56) References Cited

U.S. PATENT DOCUMENTS

| | | | | |
|---|---|---|---|---|
| 8,024,186 B1* | 9/2011 | De Bonet | ........ | H04N 21/25841 704/238 |
| 8,387,084 B1* | 2/2013 | Klappert | ........ | G06F 21/105 380/258 |
| 9,124,933 B1* | 9/2015 | Lee | ........ | H04N 21/4524 |
| 9,729,930 B2* | 8/2017 | Greenfield | ........ | H04N 21/472 |
| 2006/0020960 A1* | 1/2006 | Relan | ........ | G06F 17/30017 725/30 |
| 2009/0249413 A1* | 10/2009 | Karaoguz | ........ | H04N 21/235 725/105 |
| 2009/0300773 A1* | 12/2009 | Pal | ........ | H04H 60/31 726/27 |
| 2010/0080413 A1* | 4/2010 | Chen | ........ | G06F 21/10 382/100 |
| 2010/0115540 A1* | 5/2010 | Fan | ........ | H04N 21/25816 725/1 |
| 2011/0004893 A1* | 1/2011 | Borislow | ........ | H04N 7/165 725/25 |

(Continued)

*Primary Examiner* — Pankaj Kumar
*Assistant Examiner* — Timothy R Newlin
(74) *Attorney, Agent, or Firm* — Brownstein Hyatt Farber Schreck, LLP

(57) ABSTRACT

In various embodiments, a method of content access device geolocation verification includes determining local geolocation information, identifying proximate content access devices that are associated with a content delivery network provider, and transmitting the information to a content delivery network provider device that takes an action if a location of a content access device mismatches a recorded location. In some embodiments, a content delivery network provider device receives local geolocation information and data regarding identified proximate content access devices from an electronic device, analyzes the information to determine whether a location of a content access device mismatches a recorded location, and, if the location of the content access device mismatches the recorded location, takes an action.

20 Claims, 6 Drawing Sheets

(56) References Cited

U.S. PATENT DOCUMENTS

| | | | | |
|---|---|---|---|---|
| 2011/0055862 A1* | 3/2011 | Harp | H04N 7/17318 | 725/25 |
| 2012/0174150 A1 | 7/2012 | Reddy | H04N 21/25841 | 725/31 |
| 2013/0276017 A1* | 10/2013 | Walker | H04N 21/44204 | 725/25 |
| 2014/0267571 A1* | 9/2014 | Periyannan | H04N 7/15 | 348/14.08 |
| 2015/0040148 A1* | 2/2015 | Lonstein | H04N 21/44236 | 725/9 |
| 2016/0269791 A1* | 9/2016 | Laczynski | H04N 21/47202 | |
| 2017/0078760 A1* | 3/2017 | Christoph | H04N 21/2387 | |
| 2017/0238032 A1* | 8/2017 | Casavant | H04N 21/25816 | 725/25 |

* cited by examiner

CONTENT ACCESS DEVICE GEOLOCATION VERIFICATION

BACKGROUND

Many content delivery networks use content access devices. For example, cable and/or satellite content delivery networks use content access devices such as set top boxes, digital video recorders, network digital video recorders, and so on. These content access devices allow users to request, receive, watch, and/or otherwise access content delivery network assets such as television programs, movies, on demand content, and/or other content.

In many situations, content delivery network providers intend for content access devices to be used at a limited number of locations. For example, the arrangement between a user and a content delivery network provider may specify that a content access device is to only be used at a user's home.

However, users may attempt to use content access devices at locations other than the ones at which the content delivery network provider intends. This may deprive the content delivery network provider of revenue in cases where the user was supposed to pay for the ability to use the content access device at the unauthorized location. In some cases, this may also violate content agreements, such as in a situation where the user uses the content access device in a location to access television content that is not authorized to be accessed from the location.

SUMMARY

The present disclosure relates to geolocation verification of content access devices. An electronic device determines its location, identifies proximate content access devices associated with a content delivery network provider, and transmits the location and identified proximate content access devices to a content delivery network provider device. The device receives and analyzes the information. If the device determines a content access device is in a location that mismatches its recorded location, the content delivery network provider may take one or more different actions.

In various embodiments, a method of content access device geolocation verification includes determining local geolocation information using a processing unit, identifying proximate content access devices that are associated with a content delivery network provider using the processing unit, and transmitting the local geolocation information and data regarding the identified proximate content access devices that are associated with the content delivery network provider to a content delivery network provider device using the processing unit wherein the content delivery network provider device takes an action if a location of a content access device mismatches a recorded location.

In some examples, determining the local geolocation information includes determining a geolocation information component coupled to the processing unit is inactive and providing reduced service until the geolocation information component is activated. In some implementations of such examples, determining the local geolocation information further includes providing output indicating that the reduced service will be provided until the geolocation information component is activated.

In various examples, identifying the proximate content access devices that are associated with the content delivery network provider includes communicating with at least one of the proximate content access devices. In other examples, identifying the proximate content access devices that are associated with the content delivery network provider includes receiving a broadcast transmitted by at least one of the proximate content access devices on a local network.

In numerous examples, determining the local geolocation information includes determining the local geolocation information using the processing unit and at least one of a global positioning system component coupled to the processing unit, a WiFi component coupled to the processing unit, or a Bluetooth component coupled to the processing unit.

In various examples, the content access device is one of the identified proximate content access devices. In other examples, the content access device is not one of the identified proximate content access devices.

In some embodiments, a content delivery network provider device includes a non-transitory storage medium that stores instructions, a communication device, and a processing unit communicably coupled to the communication device. The processing unit executes the instructions to receive local geolocation information and data regarding identified proximate content access devices that are associated with a content delivery network provider of the content delivery network provider device via the communication device from an application executing on an electronic device, analyze the local geolocation information and the data to determine whether a location of a content access device mismatches a recorded location, and, if the location of the content access device mismatches the recorded location, take an action.

In various examples, the action includes changing content available to the content access device. In some cases, the changed content corresponds to the location of the content access device. The changed content may be a degraded content. In various implementations, the processing unit transmits a message via the communication device indicating for a user of the content access device to respond in order to restore the degraded content. The degraded content may be a progressive degradation. In other examples, the action includes disabling the content access device.

In numerous embodiments, a method of content access device geolocation verification includes recording a location of a content access device associated with a content delivery network provider using a content delivery network provider device, receiving local geolocation information and data regarding identified proximate content access devices that are associated with the content delivery network provider at the content delivery network provider device from an application executing on an electronic device, and, if a current location of the content access device is determined to mismatch the recorded location based on analyzing the local geolocation information and the data, taking an action using the content delivery network provider device.

In various examples, the local geolocation information includes an electronic device location determined by the electronic device. In some examples, the method further includes determining an electronic device location based on the received local geolocation information. In such examples, determining the electronic device location based on the received local geolocation information includes identifying a known location of a local area network specified in the received local geolocation information.

In numerous examples, the data does not indicate that the content access device was identified at an electronic device location and the recorded location matches the electronic device location. In other examples, the data indicates that the content access device was identified at an electronic device location and the recorded location does not match the electronic device location.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, apparatuses, and computer program products that embody various elements of the present disclosure. However, it should be understood that the described disclosure may be practiced in a variety of forms in addition to those described herein.

The following disclosure relates to content access device geolocation verification. An electronic device (or an app or other application executing thereon) may determine its location and identify one or more content access devices associated with a content delivery network provider that are at the location. The electronic device may transmit this information to a content delivery network provider device. The device may receive and analyze the information to determine whether a content access device is in a location that mismatches its recorded location. If there is a mismatch, the content delivery network provider may take an action, such as changing content available to the content access device, providing one or more notifications, billing a user for use of the content access device in an unauthorized location, degrading service of the content access device, disabling the content access device, and so on.

These and other embodiments are discussed below with reference to FIGS. 1-5. However, those skilled in the art will readily appreciate that the detailed description given herein with respect to these Figures is for explanatory purposes only and should not be construed as limiting.

Figure 1:
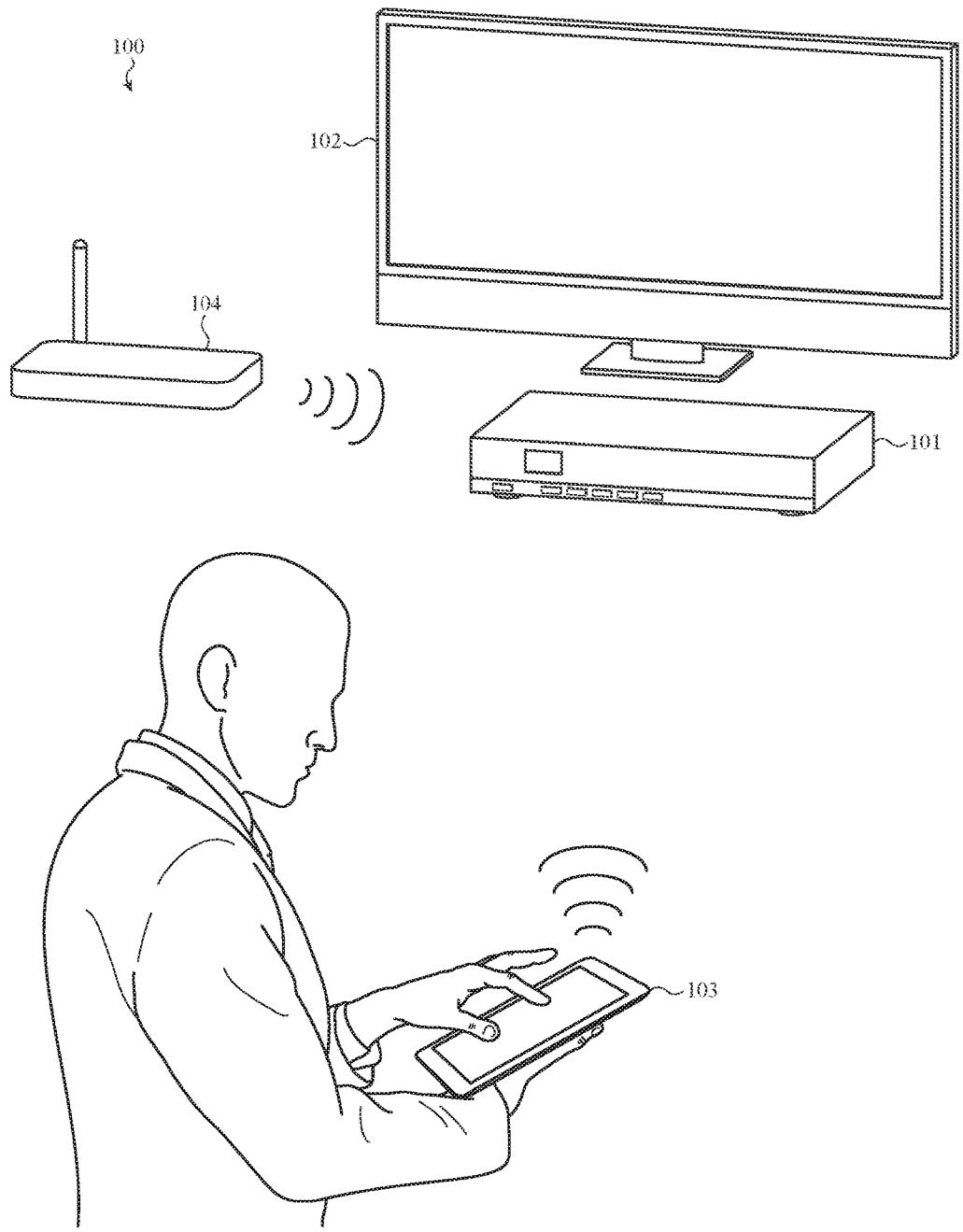
FIG. 1 depicts an example content access device geolocation verification system.

FIG. 1 depicts an example content access device geolocation verification system 100. The system 100 includes a content access device 101 and an electronic device 103. The content access device 101 may be any device that is usable to access content via a content delivery network, such as a cable, satellite, or other content delivery network. As illustrated, the content access device 101 may be a set top box, a digital video recorder, or other device operable to present content on a content presentation device 102. However, in various examples, the content access device 101 may itself include components for presenting the accessed content and the content presentation device 102 may be omitted. The electronic device 103 may be any device such as a tablet, smart phone, laptop, mobile device, wearable device, or other computing device that executes an app, application, or other set of instructions that performs a method of content access device geolocation verification.

Figure 2:
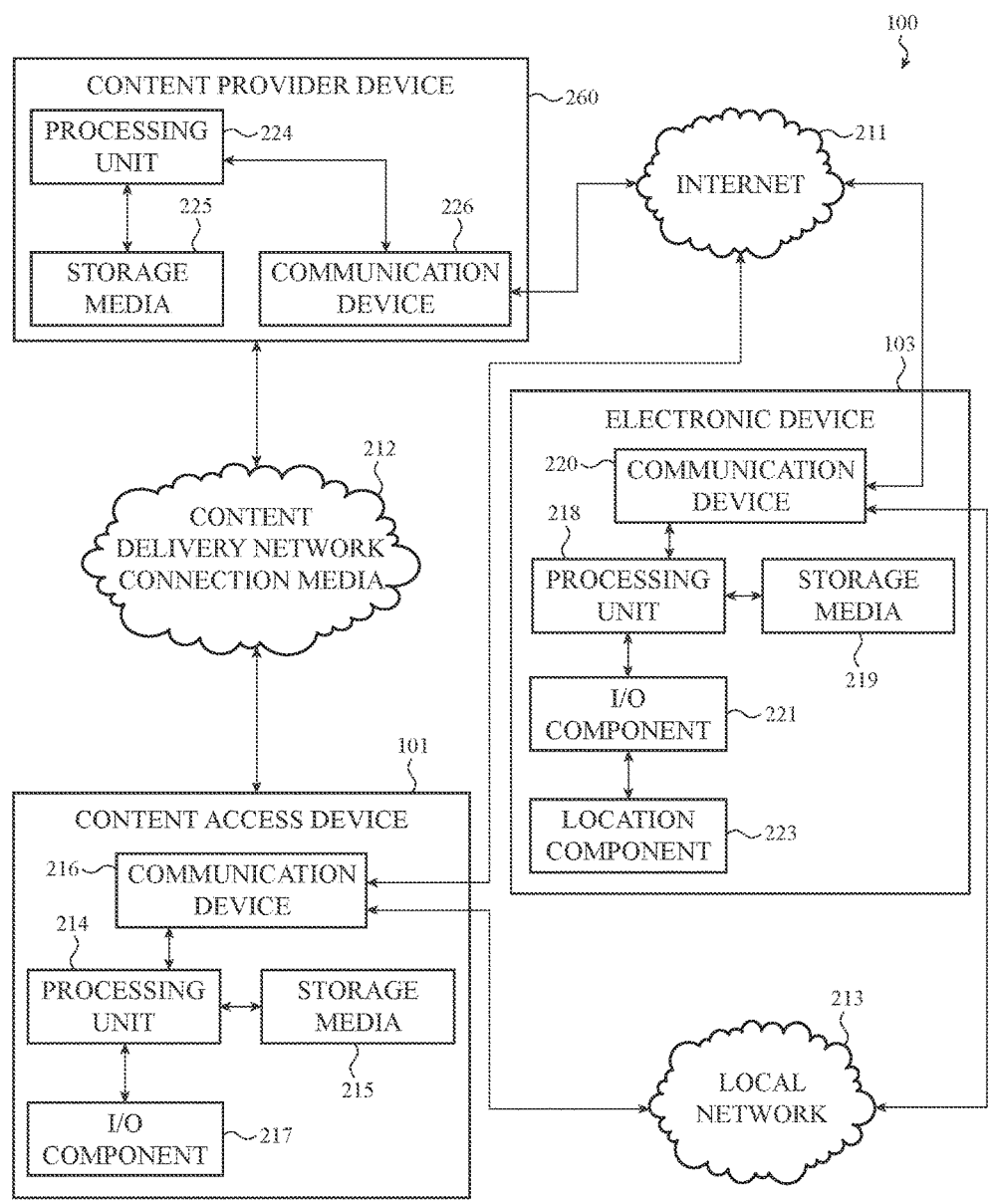
FIG. 2 depicts an example block diagram illustrating components that may be used to implement the content access device geolocation verification system of FIG. 1.

The electronic device 103 may determine local geolocation information, identify proximate content access devices that are associated with a content delivery network provider, and transmit the local geolocation information regarding the identified proximate content access devices that are associated with the content delivery network provider to a content delivery network provider device (such as the content provider device 260 of FIG. 2). The electronic device 103 may perform these operations as part of executing the app, application, or other set of instructions, whether actively, as a background process, and so on. Accordingly, the content delivery network provider device or other device associated with the content delivery network provider may take an action if a location of a content access device mismatches a recorded location for the content access device. Such an action may include changing content available to a content access device, providing one or more notifications, billing a user for use of a content access device in an unauthorized location, degrading service of a content access device, disabling a content access device, requiring a user to update the registered use location for the content access device, and so on.

In this way, a content delivery network provider may verify the location in which a content access device 101 is being used. In some cases, the location may be determined based on a network address of the content access device 101 either instead of and/or in addition to the content access device geolocation verification procedure discussed above. However, network addresses may be faked and/or may be the same in multiple locations. As such, the content access device geolocation verification procedure discussed above may determine content access device 101 locations more accurately than analyzing a network address of the content access device 101.

This content access device geolocation verification procedure may improve operation of the content access device 101 and/or the electronic device 103 in that neither the content access device 101 nor the electronic device 103 perform more burdensome operations for authenticating a content access device 101 location. Further, greater functionality and/or content access may be available to the content access device 101 due to the greater certainty regarding the location of the content access device 101.

The app, application, or other set of instructions executed by the electronic device 103 may be provided by a content delivery network provider and/or otherwise usable to interact with the content delivery network of such a provider, such as to access content assets through the content delivery network provider, manage an account with the content delivery network provider, and so on.

For example, the app may be used as part of initially setting up the content access device 101 for use with the content delivery network. The electronic device 103 may execute a configuration process that detects the content access device 101, detects the local geolocation information, and transmits data regarding both to the content network provider, such as a media access control address for the content access device 101 and the local geolocation information (such as global positioning system coordinates, a WiFi address, a network address, a Bluetooth address, other global or location coordinates, and so on).

By way of another example, the app may detect and transmit information regarding local geolocation information and any detected proximate content access devices 101 at various times. In some cases, the app may run as a background process and periodically, continuously, and/or upon the occurrence of a trigger condition determine and transmit such information. In other cases, the app may detect and transmit such information whenever the app is launched or opened, used for accessing content or other services, and so on.

The electronic device 103 may include one or more components that may be used to determine the local geolocation information. Such components may include global positioning system components, Bluetooth components, WiFi components, and so on. In some examples, those components may be capable of being deactivated, disabled, and/or otherwise rendered unusable for determining location. However, as the app may be used to provide services, the electronic device 103 may provide reduced and/or no services until those components are activated.

For example, the app may determine that location components are disabled, provide a notification or other output that one or more provided services will not be provided until the location components are enabled, and provide reduced and/or no services. When the location components are enabled, the app may switch to providing the full services, as well as determine and transmit the information regarding location and detected content access devices 101.

The electronic device 103 and/or the app may identify proximate content access devices 101 by communicating with any content access devices 101 within communication range. For example, the electronic device 103 may pair with the content access device 101 in order to communicate and/or otherwise interact. Based on such pairing and/or communication, the electronic device 103 may determine that the content access device 101 is proximate.

The electronic device 103 may also communicate with content access devices 101 without pairing. For example, the electronic device 103 may transmit inquiries and receive responses, either directly and/or indirectly via a local or other network, such as a local wireless network provided via a wireless access point 104. In such an example, the electronic device 103 may identify proximate content access devices 101 based on responses received to transmitted inquiries.

In other cases, the content access device 101 may transmit a broadcast, such as a service set identifier, via the local network. The electronic device 103 may receive such broadcasts and identify proximate content access devices 101 based thereon.

Content access device 101 location may be determined when the electronic device 103 detects the content access device 101 at a location. However, content access device 101 location may also be determined when the electronic device 103 fails to detect the content access device 101 at a location where the content access device 101 should be.

For example, the content access device 101 may be registered to be used at a user's home. However, the user may have taken the content access device 101 to another location for use. The user may then use the electronic device 103 at the user's home. The electronic device 103 may determine and transmit the location of the electronic device 103. As the content access device 101 is not present to be detected, the transmitted information would not include information regarding the content access device 101. Due to the absence of the information regarding the content access device 101, the content delivery network provider may assume that the content access device 101 may be in use at a location other than the recorded location.

In some cases of such an example, the content access device 101 may be at the recorded location but may not have been detected by the electronic device 103. For example, the content access device 101 may be powered off and the electronic device 103 may not be able to detect it. However, if the content access device 101 is in use at an unauthorized location, the content delivery network provider may be able to detect that the content access device 101 is still connected to the content delivery network. Thus, the content delivery network provider may be able to assume that the content access device 101 is being used at an unauthorized location if the content access device 101 is connected to the content delivery network and was not detected at the recorded location by the electronic device 103.

Similarly to the above, the content delivery network provider device (such as the content provider device 260 of FIG. 2) may receive local geolocation information and data regarding identified proximate content access devices 101 that are associated with the content delivery network provider from the electronic device 103. The content delivery network provider device may analyze the local geolocation information and the data to determine whether a location of a content access device 101 mismatches a recorded location (and/or record such a location for the content access device 101). If the location of the content access device 101 mismatches the recorded location, the content delivery network provider device and/or other device associated with the content delivery network provider may take one or more actions.

For example, the action may include changing content available to the content access device 101. In such an example, the changed content may correspond to the location of the content access device 101, such as where authorization for certain programming is dependent on location and content authorized for the recorded location is disabled in favor of content authorized for the current location of the content access device.

In other cases of such an example, the content may be a degraded content, which may be a progressive degradation. For example, the bandwidth at which the content access device 101 receives content may be progressively slowed. By way of another example, national channels may be disabled whereas local channels remain available, or vice versa. By way of still another example, live television may remain available whereas recorded content is disabled, or vice versa.

In yet another example, channels and/or various types of content may be progressively disabled until the user updates the registered location of the content access device 101, returns the content access device 101 to the authorized location, and/or otherwise appropriately corrects the situation. In such a situation, the content access device 101 may be entirely disabled if the user does not respond. In other cases, the content access device 101 may be immediately disabled without any progressive and/or otherwise degradation or reduction of content.

In some cases, the content delivery network provider device may transmit a message indicating that content is being degraded and for a user of the content access device to respond in order to restore the degraded content. For example, the user may call in to the content delivery network provider to explain the unauthorized location use, alter the user's account, and so on.

In various examples, the content delivery network provider device (such as the content provider device 260 of FIG. 2) may record a location of a content access device 101 associated with the content delivery network provider and receive local geolocation information regarding identified proximate content access devices that are associated with the content delivery network provider from the app. If a current location of a content access device 101 is determined to mismatch the recorded location based on analyzing the local geolocation information and the data, the content delivery network provider device may take an action. Such an action may be one or more of the actions described above.

The local geolocation information may include an electronic device location determined by the electronic device 103. However, it is understood that this is an example. In other implementations, the local geolocation information may include data that may be used to determine the electronic device location. In such an example, the content delivery network provider device may determine the electronic device location based on the received geolocation information. In some cases, the content delivery network provider device may determine the electronic device location by identifying a known location of a local area network specified in the received local geolocation information.

In some examples, the data received by the content delivery network provider device does not indicate that the content access device 101 was identified at an electronic device location and the recorded location matches the electronic device location. As such, the content delivery network provider device may assume by negative implication that a mismatch has occurred. In other examples, the data received by the content delivery network provider device indicates that the content access device 101 was identified at an electronic device location and the recorded location does not match the electronic device location. As such, the content delivery network provider device may directly detect that a mismatch has occurred.

In various implementations, the above techniques may be combined with other techniques for content access device geolocation verification. For example, the content delivery network provider device may detect that the content access device 101 has a network address that indicates that it is being used at a location other than the recorded location. The content delivery network provider device may then require a user to use the app on the electronic device 103 proximate to the content access device 101 at the recorded location in order to prove that the content access device 101 is being used at an authorized location. If the user does not comply, the content delivery network provider may degrade the content available to the content access device 101 and/or otherwise similarly respond.

FIG. 2 depicts an example block diagram illustrating components that may be used to implement the content access device geolocation verification system 100 of FIG. 1. As illustrated in FIG. 1, the system 100 may include the content access device 101 and the electronic device 103. As previously described, the system 100 may also include the content provider device 260 (or a content delivery network provider device). The content access device 101 may be connected to the content provider device 260 via one or more content delivery network connection media 212 (such as one or more satellite, cable, fiber, Internet, or other communication connections), the Internet 211 and/or other networks such as a local network 213, the electronic device 103, and so on. The electronic device 103 may also be connected to the content provider device 260, such as via the Internet 211 and/or other network.

The electronic device 103 may include one or more processing units 218, one or more non-transitory storage media 219 (which may take the form of, but is not limited to, a magnetic storage medium; optical storage medium; magneto-optical storage medium; read only memory; random access memory; erasable programmable memory; flash memory; and so on) that stores instructions, one or more communication devices 220, one or more input/output components 221, one or more geolocation information and/or other location components 223 (such as one or more global positioning system components or devices, Bluetooth components or devices, WiFi components or devices, and/or the like), and so on. Similarly, the content access device 101 may include one or more processing units 214, one or more non-transitory storage media 215 that stores instructions, one or more communication devices 216, one or more input/output components 217, and/or the like. Likewise, the content provider device 260 may include one or more processing units 224, one or more non-transitory storage media 225 that stores instructions, one or more communication devices 226, and/or the like.

Although the content access device 101, electronic device 103, and content provider device 260 are illustrated and described as including particular components that perform particular functions, it is understood that these are examples. In various implementations, the content access device 101, electronic device 103, and content provider device 260 and/or the system 100 may include various arrangements of the same, similar, and/or different components communicably or otherwise coupled in various manners without departing from the scope of the present disclosure.

Figure 3A:
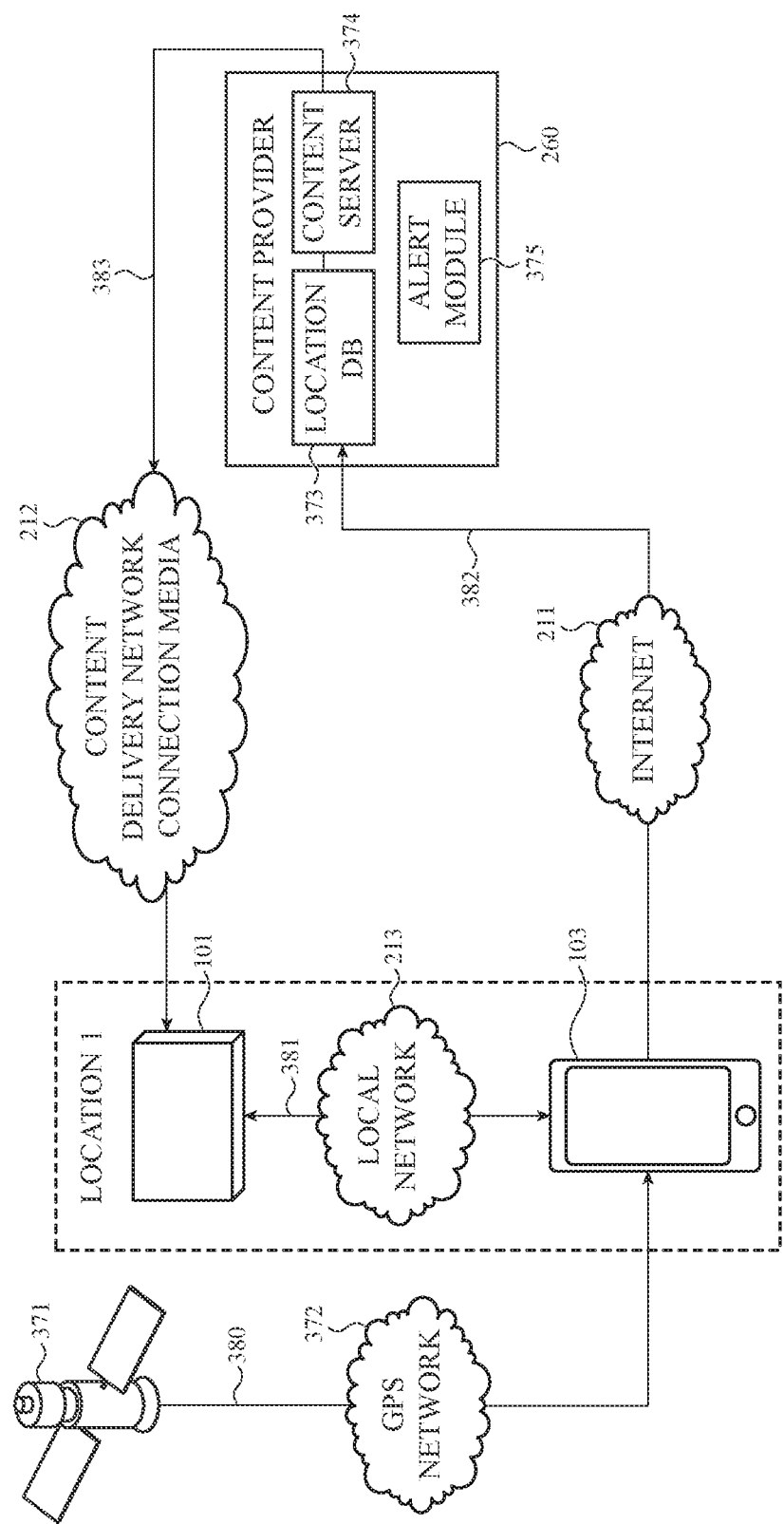
FIG. 3A depicts a first example of geolocation verification of a content access device at an authorized location.

FIG. 3A depicts a first example of geolocation verification of a content access device 101 at an authorized location. As shown, the content access device 101 is at a "Location 1" along with an electronic device 103. The electronic device 103 receives global positioning information via a GPS communication 380 from a global positioning system satellite 371 via a global positioning system network 372. The electronic device 103 also identifies the content access device 101 by communicating 381 with the content access device 101 via a local network 213. The electronic device 103 then transmits the global positioning information and the identity of the content access device 101 to a content provider 260 in a communication 382 transmitted over the Internet 211.

The content provider 260 receives the communication 382 at a Location Database 373 where it is determined that "Location 1" is an authorized location for the content access device 101. Therefore, a communication 383 is directed from Location Database 373 to the content access device 101 through a content server 374 and one or more content delivery network connection media 212, providing content to the content access device 101.

Figure 3B:
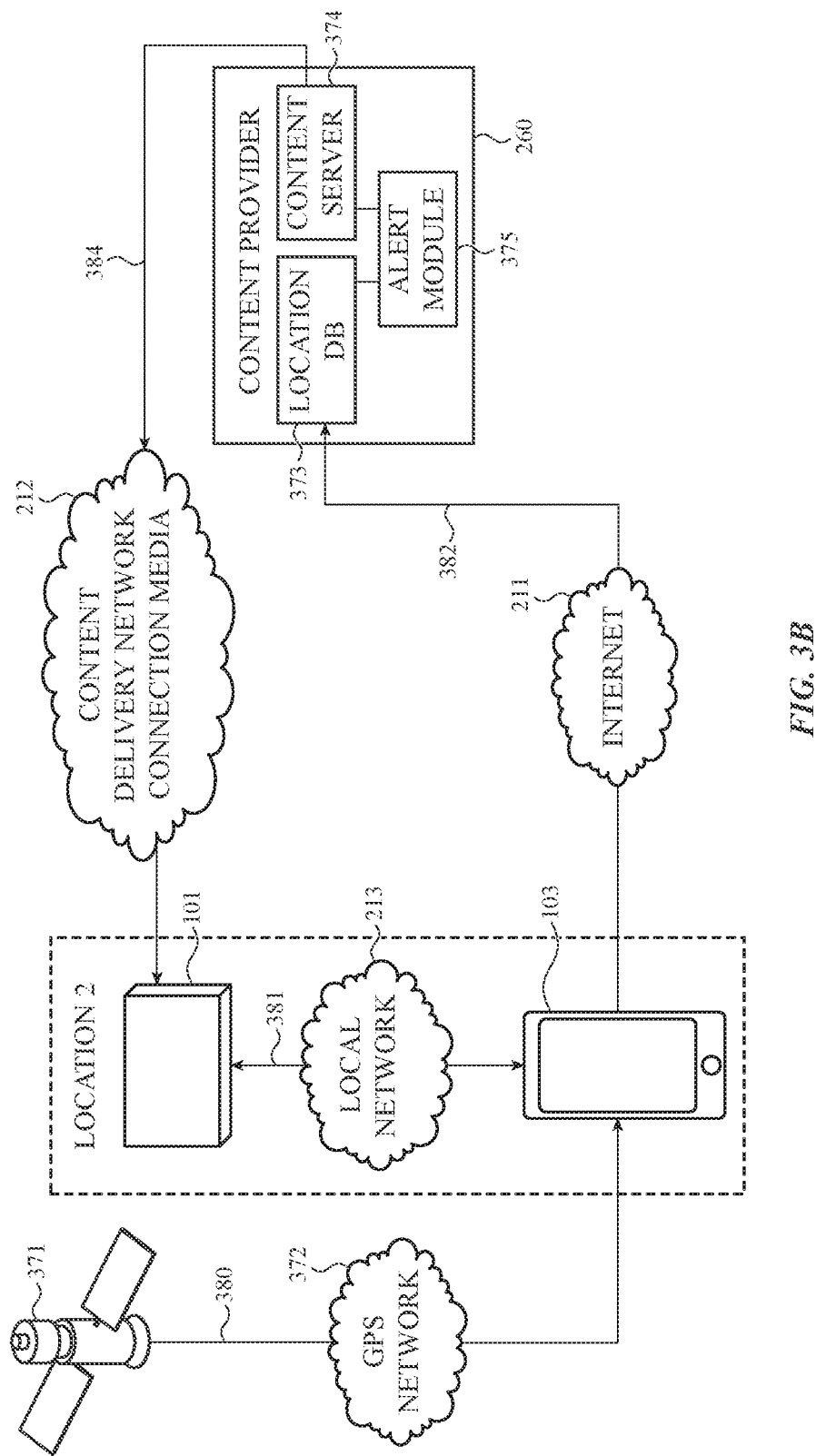
FIG. 3B depicts a second example of geolocation verification of a content access device at an unauthorized location.

As illustrated in FIG. 3B, the content access device 101 and the electronic device are then transported to a "Location 2" that is not authorized for the content access device 101. Similar to the example shown in FIG. 3A, in the example illustrated in FIG. 3B, the electronic device 103 receives the global positioning information via the GPS communication 380 from a global positioning system satellite 371, identifies the content access device 101 by communicating 381 with the content access device 101, and transmits the global positioning information and the identity of the content access device 101 to the content provider 260.

However, when the content provider 260 receives the communication 382 at a Location Database 373, it is determined that "Location 2" is not an authorized location for the content access device 101. Therefore, a communication 384 is directed from Location Database 373 to the content access device 101 through an Alert Module 375 before the content server 374 and one or more content delivery network connection media 212. The Alert Module 375 directs the content server 374 to provide a restricted form of content due to the unauthorized location and a notification regarding the unauthorized use.

Although FIGS. 3A and 3B illustrate a particular configuration and particular communication flows, it is understood that these are examples. Various other configurations may be used with the same, similar, and/or different communication flows without departing from the scope of the present disclosure.

For example, FIGS. 3A and 3B are illustrated and described as having the electronic device 103 communicate 382 the global positioning information and the identity of the content access device 101 to the content provider 260. However, in other examples, the content access device 101 may receive the global positioning information from the electronic device 103 and may communicate the global positioning information and the content access device 101 identity to the content provider 260 directly. For example, the content access device 101 may communicate the global positioning information and the content access device 101 identity to the content provider 260 via the content delivery network connection media 212.

Figure 4:
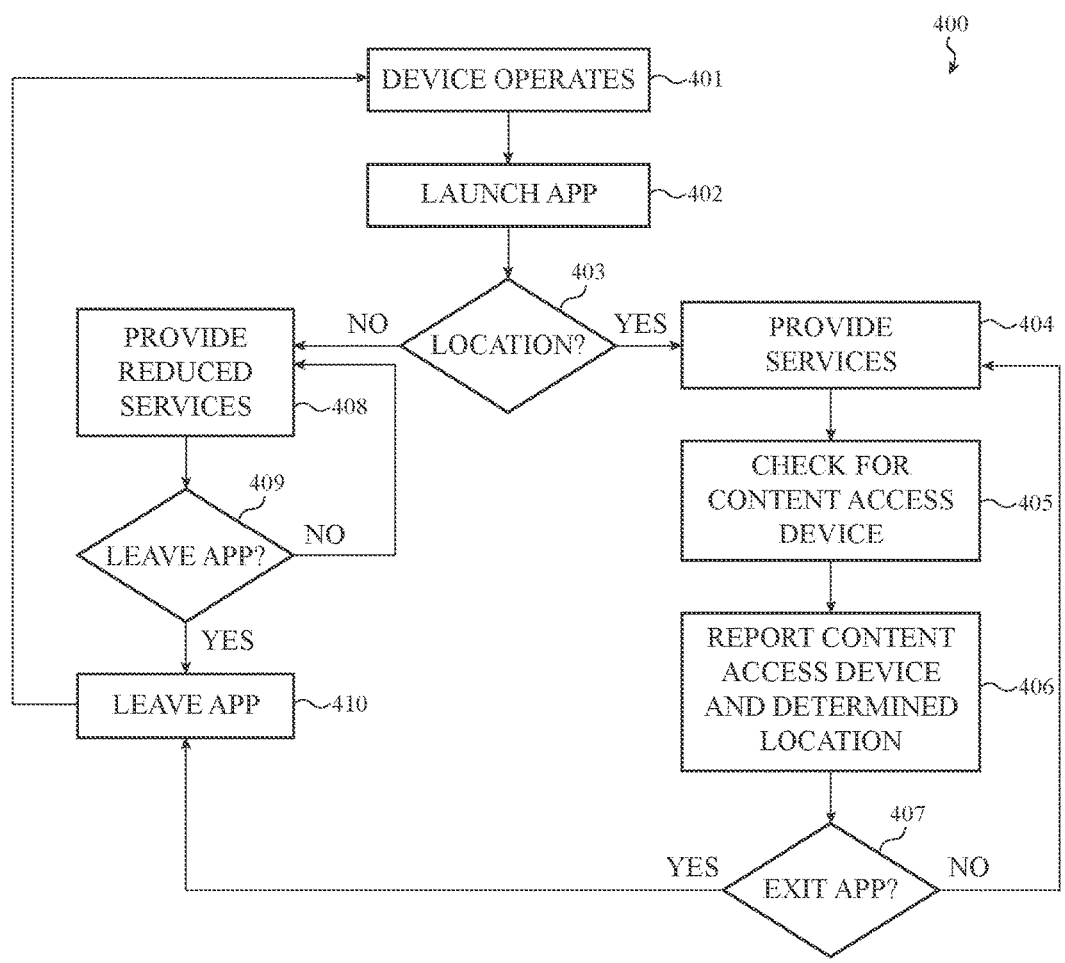
FIG. 4 depicts a flow chart illustrating a first example method of content access device geolocation verification. This first example method may be performed by the systems of FIGS. 1 and/or 2.

FIG. 4 depicts a flow chart illustrating a first example method 400 of content access device geolocation verification. This first example method 400 may be performed by the systems 100 of FIGS. 1 and/or 2.

The flow begins at 401 where the device operates. The flow proceeds to 402 where the device launches an app or application and/or otherwise executes software instructions. Launching may include opening the app, resuming execution of the app, continuing execution of the app, switching to the app, and so on. The app may be an app provided by a content delivery network provider and/or is otherwise usable to interact with the content delivery network of such a provider. For example, the app may be an app usable to access content assets through the content delivery network provider, manage an account with the content delivery network provider, and so on. The flow may then proceed to 403.

At 403, the device determines whether or not one or more components that may be used to determine local geolocation information are active. If so, the flow may proceed to 404. Otherwise, the flow may proceed to 408.

At 404, after the device determines that the location component is active, the device provides one or more services via the app. The services may be presentation of content such as linear broadcast, on demand, recorded, and so on of assets such as television, movies, and the like. The services may also be presentation of social media applications, content searches, account administration or configuration, and/or any other kind of service.

The flow may then proceed to 405 where the device checks whether or not the device can detect any content access devices. The device may check for content access devices that are associated with the same content delivery network provider that is associated with the app. In some examples, the content access devices at the location where the device is located, content access devices proximate to the device, and so on may pair with the device in order for various actions to be performed and the device may determine the presence of the content access devices based on the pairing. In other examples, the content access devices may respond to inquiries transmitted by the device (such as over Ethernet, WiFi, Bluetooth, and so on) and the device may determine the presence of the content access devices based on responses. In still other examples, the content access devices may broadcast service set identifiers and/or other identifiers over a local network (such as a WiFi network, Ethernet network, Bluetooth network, and so on) and the device may determine the presence of the content access devices based on received identifiers that have been broadcast.

Next, the flow may proceed to 406 where the device transmits the content access devices that have been detected along with a determined location and/or other local geolocation information that can be used to determine the location of the device and/or content access devices. For example, the device may determine its location using a global positioning system device, Bluetooth device, WiFi device (such as where a particular wireless network access point has a known location), and/or other device or combination thereof. The device may transmit information regarding the detected content access devices and the determined location to a computing device associated with the content delivery network provider that is associated with the app and/or the content access devices. Such a content delivery network provider may take various actions based on the transmitted information.

The flow may then proceed to 407 where the device determines whether or not to exit the app. If not, the flow may return to 404 where the device continues to provide the services. Otherwise, the flow may proceed to 410 where the device quits, leaves, and/or otherwise switches away from the app.

At 408, after the device determines that the location component is not active and/or is otherwise disabled or inactive, the device provides a reduced version of the one or more services via the app. For example, content may be presented at a lower bandwidth or quality, less content may be available for presentation, only a subset of options may be selectable, and/or any other manner in which the services may be reduced may be used to provide the reduced version of the services.

The flow then proceeds to 409 where the device determines whether or not to leave the app. Leaving the app may include closing the app, exiting the app, ceasing execution of the app, not currently executing the app, switching away from the app, and so on. If so, the flow proceeds to 410 where the device leaves the app. Otherwise, the flow returns to 408 where the device continues to provide the reduced version of the one or more services via the app.

At 410, after the device determines to exit the app, the device leaves the app. The flow then returns to 401 where the device continues to operate.

Although the example method 400 is illustrated and described as including particular operations performed in a particular order, it is understood that this is an example. In various implementations, various orders of the same, similar, and/or different operations may be performed without departing from the scope of the present disclosure.

For example, 406-407 illustrate and describe the device checking and reporting content access devices and location while the device provides services. However, it is understood that this is an example. In various implementations, the device may check and report at various times, continuously, in response to trigger events such as app launch, at intervals running as a background process, and so on.

By way of another example, 403-410 illustrate and describe the device providing reduced services if the components that may be used to determine local geolocation information are inactive and/or are otherwise disabled or unavailable. However, it is understood that this is an example. In various implementations, the device may prompt a user that reduced services will be provided and that full services would instead be provided if the user activated the components. In such implementations, the device may then provide the full services if the user activates the components.

Figure 5:
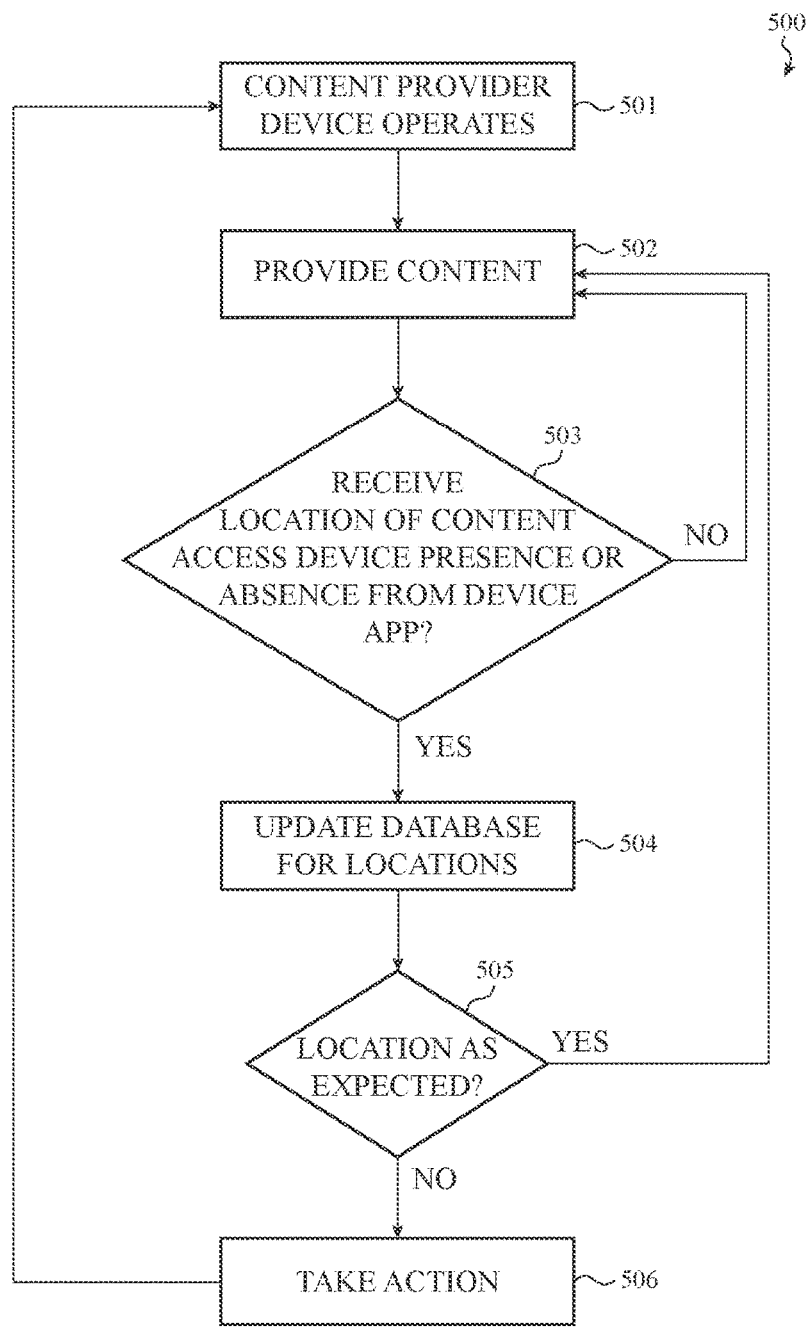
FIG. 5 depicts a flow chart illustrating a second example method of content access device geolocation verification. This second example method may be performed by the systems of FIGS. 1 and/or 2.

FIG. 5 depicts a flow chart illustrating a second example method 500 of content access device geolocation verification. This second example method 500 may be performed by the systems 100 of FIGS. 1 and/or 2.

The flow begins at 501 where the content provider device operates. The content provider device may be a headend or one or more other content provider devices, such as a video on demand server, a content storage server, and so on. The flow proceeds to 502 where the content provider device provides content. The content may be linear content, non-linear content, television programs, movies, video on demand content, and/or any other content assets. The content device may provide the content by broadcasting, transmitting, and/or otherwise arranging for content access devices to receive the content.

Next, the flow may proceed to 503 where the content provider device determines whether or not a location of content access device presence or absence is received from an app executing on a device. The location may be a location of content access device presence when one or more content access devices are identified as detected at that location. The location may be a location of content access device absence when one or more content access devices are not identified as detected at that location but would be expected to be detected at the location (e.g., supporting a negative inference that non-present expected content access devices have been moved). If so, the flow proceeds to 504. Otherwise, the flow returns to 502 where the content provider device continues to provide content.

At 504, after the location of content access device presence or absence is received, the content provider device updates a database or other data storage for the received location(s). The flow then proceeds to 505 where the content provider device determines whether the location is as expected. The location may be as expected if no content access devices not associated with the location in the database were detected as present at the location and no content access devices associated with the location in the database were not detected as present at the location. However, the location may not be as expected if the presence or absence of a content access device at the location does not match records in the database. If not, the flow proceeds to 506. Otherwise, the flow returns to 502 where the content provider device continues to provide content.

At 506, after the content provider device determines that the location is not as expected, the content provider device takes one or more actions. Such actions may include changing content available to a content access device, providing one or more notifications, billing a user for use of a content access device in an unauthorized location, degrading service of a content access device, disabling a content access device, requiring a user to update the registered use location for the content access device, and so on. The flow may then return to 501 where the content provider device continues to operate.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 illustrates and describes the same content provider device providing content as verifying locations. However, in various implementations, each of these functions may be performed by one or more different content provider devices, whether singly or in concert. Various content delivery network provider configurations are possible and contemplated without departing from the scope of the present disclosure.

By way of another example, the method 500 illustrates and describes the content provider device as verifying locations. However, in various implementations, the content provider device may also receive locations as part of a database configuration process where the content provider device receives a location or geolocation information and detected content access devices in order to register the content access device with the location.

In still another example, the method 500 illustrates and describes the content provider device receiving the location. However, in various implementations, the content provider device may receive various kinds of local geolocation information that may be used to determine the location rather than indicating the determined location. Such local geolocation information may be global positioning system information, Bluetooth network information, WiFi network information, and/or any other such information that may be used to determine the location and/or may itself identify the location.

As described above and illustrated in the accompanying figures, the present disclosure relates to content access device geolocation verification. An electronic device (or an app or other application executing thereon) may determine its location and identify one or more content access devices associated with a content delivery network provider that are at the location. The electronic device may transmit this information to a content delivery network provider device. The device may receive and analyze the information to determine whether a content access device is in a location that mismatches its recorded location. If there is a mismatch, the content delivery network provider may take an action, such as changing content available to the content access device, providing one or more notifications, billing a user for use of the content access device in an unauthorized location, degrading service of the content access device, disabling the content access device, and so on.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method of content access device geolocation verification, comprising:
    determining location information, using a processing unit of an electronic device;
    receiving identifiers from a group of content access devices, using the electronic device;
    identifying proximate content access devices that are associated with a provider based on the identifiers, using the processing unit; and
    signaling the provider to take an action if a location of a content access device mismatches a recorded location, by transmitting the location information and data regarding the proximate content access devices from the electronic device to a provider device; wherein:
    the content access device is not one of the proximate content access devices.

2. The method of claim 1, wherein identifying the proximate content access devices that are associated with the provider comprises communicating with at least one of the proximate content access devices.

3. The method of claim 1, wherein identifying the proximate content access devices that are associated with the provider comprises receiving a broadcast transmitted by at least one of the proximate content access devices on a local network.

4. The method of claim 1, wherein determining the location information comprises determining the location information using the processing unit and at least one of a global positioning system component coupled to the processing unit, a WiFi component coupled to the processing unit, or a Bluetooth component coupled to the processing unit.

5. The method of claim 1, wherein the method is performed by an application executing on a mobile computing device.

6. A method of content access device geolocation verification, comprising:
    determining location information, using a processing unit of an electronic device;
    receiving identifiers from a group of content access devices, using the electronic device;
    identifying proximate content access devices that are associated with a provider based on the identifiers, using the processing unit; and
    signaling the provider to take an action if a location of a content access device mismatches a recorded location, by transmitting the location information and data regarding the proximate content access devices from the electronic device to a provider device; wherein determining the location information comprises:
    determining a geolocation information component coupled to the processing unit is inactive; and
    transmitting a notification to the provider device to provide reduced service without terminating service until the geolocation information component is activated.

7. The method of claim 6, wherein determining the location information further comprises providing output indicating that the reduced service will be provided until the geolocation information component is activated.

8. A content delivery network provider device, comprising:
    a non-transitory storage medium that stores instructions;
    a communication device; and
    a processing unit, communicably coupled to the communication device, that executes the instructions to:
    receive location information and data regarding content access devices from an electronic device that obtained identifiers by communicating with a group of content access devices proximate to the electronic device;
    identify a content access device associated with the content delivery network provider device;
    analyze the location information and the data to determine whether a location of the content access device mismatches a recorded location; and
    if the location of the content access device mismatches the recorded location, take an action; wherein:
    the action comprises degrading content available to the content access device a first amount and then a second amount without terminating the content.

9. The content delivery network provider device of claim 8, wherein the action further comprises changing content available to the content access device by making other content available to the content access device.

10. The content delivery network provider device of claim 9, wherein the other content corresponds to the location of the content access device.

11. The content delivery network provider device of claim 9, wherein the action further comprises removing access to at least some previously accessible content.

12. The content delivery network provider device of claim 8, wherein the processing unit transmits a message via the communication device indicating for a user of the content access device to respond in order to restore the content after degrading.

13. The content delivery network provider device of claim 8, wherein the content is degraded a third amount first amount.

14. The content delivery network provider device of claim 8, wherein the action comprises transmitting a message to disable the content access device.

15. A method of content access device geolocation verification, comprising:
    recording a location of a content access device associated with a provider, using a provider device;
    receiving location information and data regarding content access devices from an electronic device that obtained identifiers by communicating with a group of content access devices proximate to the electronic device; and if a current location of the content access device is determined to mismatch the recorded location based on the location information and the data, taking an action, using the provider device; wherein:

the content access device is not one of the group of content access devices proximate to the electronic device.

16. The method of claim 15, wherein the location information comprises a location of the electronic device determined by the electronic device.

17. The method of claim 15, further comprising determining a location of the electronic device based on the received location information.

18. The method of claim 17, wherein determining the location of the electronic device based on the received location information comprises identifying a known location of a local area network specified in the received location information.

19. The method of claim 15, wherein the data does not indicate that the content access device is at a location of the electronic device and the recorded location matches the location of the electronic device.

20. The method of claim 15, wherein the data indicates that the content access device is at a location of the electronic device and the recorded location does not match the location of the electronic device.

* * * * *

UNITED STATES PATENT AND TRADEMARK OFFICE
CERTIFICATE OF CORRECTION

PATENT NO. : 10,264,317 B2
APPLICATION NO. : 15/279086
DATED : April 16, 2019
INVENTOR(S) : Jeffrey Binder Page 1 of 1

It is certified that error appears in the above-identified patent and that said Letters Patent is hereby corrected as shown below:

In the Claims

In Column 14, at Lines 55-56, delete "first amount".

Signed and Sealed this
Twenty-fifth Day of June, 2019

Andrei Iancu
*Director of the United States Patent and Trademark Office*